March 27, 1962     V. J. JAMAL     3,026,725
APPARATUS FOR MEASURING TENSILE STRESSES IN FISHING LINES
Filed March 14, 1961

INVENTOR.
VICTOR J. JAMAL
BY
AGENT

United States Patent Office 3,026,725
Patented Mar. 27, 1962

3,026,725
APPARATUS FOR MEASURING TENSILE STRESSES IN FISHING LINES
Victor J. Jamal, 62 Annover Road, Lewiston, N.Y.
Filed Mar. 14, 1961, Ser. No. 95,610
4 Claims. (Cl. 73—144)

The present invention relates to apparatus for indicating and measuring the tensile stresses in fishing lines.

Heretofore, it was not possible to measure, in a simple and practical manner, the tensile stresses to which a fishing line is subjected when in operation. Nor was it, heretofore, possible to determine simply and quickly the proximity of the breaking point in a fishing line under stress.

The ability to know the instantaneous tensile stress exerted on a fishing line becomes important, for example, when, in angling operations, the line cannot be freely reeled back from the water due to unseen impediments and additional force is necessary to extricate the line.

The device of the present invention lends its utility also in the case of non-professional fishermen, in as much as it gives an instantaneous and continuous indication of the stress in the line, which stress may be translated into a substantially accurate estimate of the size of the fish being reeled back.

It is, therefore, an object of the present invention to provide a device which is simple, inexpensive, and adaptable to any type of fishing rod and which is capable of indicating and measuring, instantaneously and continuously, the tensile stresses exerted on fishing lines.

Figure 1:
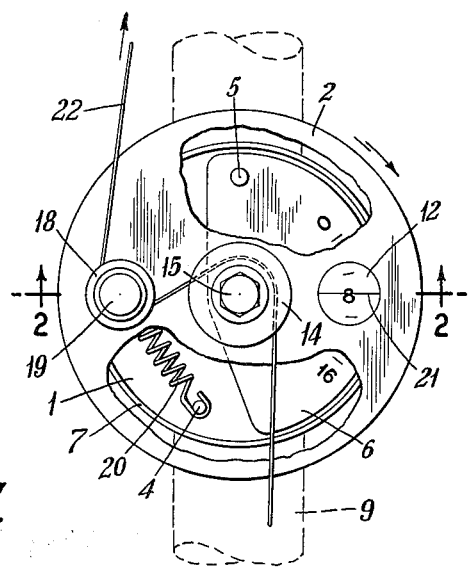
Figure 2:
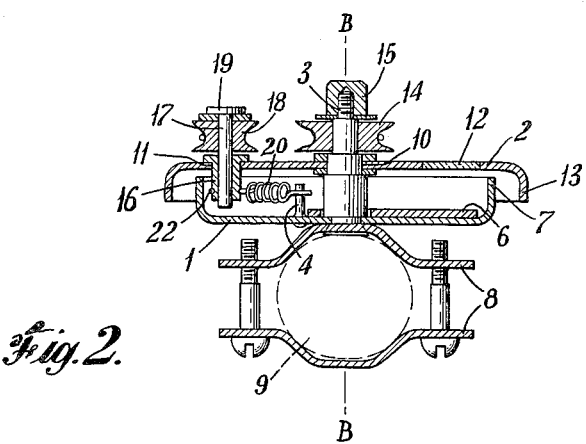

Other objects and advantages of the present invention will be apparent from the following description and from the accompanying drawings, in which:

FIGURE 1 is a partially cut-away plan view of a preferred embodiment of this invention, and FIGURE 2 is a cross-sectional view of the device shown in FIGURE 1, taken along lines 2—2.

As mentioned hereabove, it must be understood that the embodiment of the invention represented in the accompanying drawings is merely illustrative of a particularly preferred tension indicator and should not be construed as limitative to the scope of the invention.

Referring now to the drawings, there is provided a pair of circular members, 1 and 2, in vertical spaced relation to each other along the axis B—B. The lower circular member 1 is provided with a central stud 3, an engaging pin 4, and means 5 for holding and adjusting a calibrated chart 6. The outer annular portion of member 1 is bent upwardly, as shown at 7. The lower member 1 is, furthermore, fixedly connected to a suitable fastener 8 which, in turn, is removably attachable to the butt end 9 of a fishing rod.

The upper circular member 2 is provided with three openings, viz., a first central circular opening 10, through which stud 3 is inserted and protruding, a second not necessarily circular opening 11 located between opening 10 and the periphery of the member, and a third opening 12 located in vertically spaced juxtaposition with the calibrated chart 6. The peripherical annular portion of member 2 is bent downwardly, as shown at 13, and overlaps the upwardly bent portion 7 of lower member 1, so as to create a compact unit with member 1. The specific purpose of the opposite bending of members 1 and 2 and of the overlapping of the periphery of member 2 is to minimize, or substantially eliminate, hindrance by the device to the angling operation and, furthermore, to protect the enclosed zone of the device from the water originating from a wet line being reeled back.

Stud 3, which is inserted into opening 10, also supports a grooved idler wheel 14, which is held axially in position by a lock nut 15, sufficient clearance being provided between the idler wheel 14 and the lock nut 15 for free rotation of the wheel. Opening 11 is provided with a cylindrical collar 16 which extends downwardly into the enclosed zone between members 1 and 2. A pin 17 is inserted in the collar 16. Resting upon the collar 16 and freely rotating about the axis of pin 17 is a second grooved idler wheel 18 in planar relationship with idler wheel 14. Pinhead 19, similarly to lock nut 15, prevents the idler wheel to fall out of position, sufficient clearance being also provided between the pin head 19 and idler wheel 18 for free rotation.

A spring member 20 is fixedly connected to the engaging pin 4 at one end and to the cylindrical collar 16 at the opposite end. Opening 12, which is preferentially circular in shape, is preferably protected by a suitably transparent material, such as glass, celluloid, or the like, to substantially prevent water from entering the opening 12. This opening is also provided with some indicating means, in the present case a hairline, 21 for employment in conjunction with calibrated chart 6. Chart 6, in turn, is provided with a suitable scale, numerical or otherwise, which is in exact juxtaposition with the hairline 21, so that when the hairline moves in a circular manner about the axis of member 2, different and correctly positioned values of the scale are exposed to the viewer's eye through opening 12.

Means 5, besides holding the calibrated chart 6 in proper place, serves also the purpose of recalibrating the device of the invention. This is accomplished by loosening the grip of means 5 on the chart, shifting the chart to a different and properly balanced position, and retightening means 5. Such operation, however, is only rarely necessary, namely, after excessive periods of employment of a given fishing line due to alterations in its tensile strain characteristics.

The calibrated chart 6, made of suitably resistant paper, or celluloid, or metal sheet, is provided, as mentioned above, with a set of calibrated values disposed in curve-like manner and following the curvature described by the hairline 21. The other components of the apparatus may be made of any suitable material, provided it is water repellant and also substantially corrosion resistant to salted water, if employed in conjunction with sea fishing. The requirement of a substantially waterproof device explains the preferred shape of members 1 and 2, namely the overlapping edges thereof, and the protective seal on opening 12.

To more clearly illustrate the operation of the device of the invention, after the fishing line has been cast in the water, the portion of the line in the vicinity of the reel (not shown) is engaged around the two idler wheels, as shown in FIGURE 1, the numeral 22 indicating the fishing line and the arrow representing the direction of casting. As soon as a tensile stress is exercised upon the line, as in the case of a hooked fish, the S-shaped curvature in the line around the idler wheels tends to straighten and, in so doing, the circular member 2 rotates clockwise about stud 3. The spring member 20, when acted upon by the rotatable member 2, offers to it an opposing force which is calibrated on chart 6, thusly preventing member 2 from freely pivoting around stud 3, but allowing only such degree of rotation which is commensurate to the stress exercised on the spring member and, consequently, on the line 22, and is numerically translated upon chart 6. Thus, whatever value the hairline 21 indicates, such value corresponds to the summation of all concurrent stresses in line 22, such as, for example, the stress exerted by a fish, or by the current in a body of water, or by the wind, or by the angle or direction of reeling.

It can, therefore, be seen that the apparatus hereinbefore described is capable of indicating and measuring tensile stresses exerted upon a fishing line, in a manner which is accurate, simple and instantaneous.

Numerous modifications of the physical structure of the components of the apparatus are possible and readily available to those skilled in the art. Thus, for example, lower member 1 needs not be circular, but may be rectangular, or square-shaped, or even irregular in surface design. Similarly, the lower portion of collar 16, to which spring member 20 is connected, needs not to be circular. Also, if auxiliary means are provided for removing the greater portion of the water absorbed by the fishing line, the peripherical portion of members 1 and 2 needs not to be bent or overlapping.

What is claimed is:

1. A tension indicating and measuring device, suitable for angling operations, which comprises, in combination, a lower fixed circular member and an upper rotatable circular member, said members being in vertically spaced relationship with each other and having their peripherically annular portions convergently bent and overlapping; a first idler wheel rotatable about a central stud, said stud being in planarly perpendicular relationship with said lower and upper members and being fixedly connected to said lower member; a second idler wheel rotatable about a pin fixedly connected to said upper member and planarly positioned between said first idler wheel and the periphery of said upper member; a spring interplanarly and fixedly connected to said lower and upper members; a numerically calibrated chart removably attachable to said lower member; and a hairline-containing transparent disc inserted into a circular opening provided in said upper member symmetrically opposite to said second idler wheel, said hairline being in vertically spaced juxtaposition with the calibrated chart.

2. A tension indicating and measuring device, suitable for angling operations, which comprises, in combination, a lower fixed circular member and an upper rotatable circular member, said members being in vertically spaced relationship with each other and having their peripherically annular portions convergently bent; a first idler wheel rotatable about a central stud, said stud being in planarly perpendicular relationship with said lower and upper members and being fixedly connected to said lower member; a second idler wheel rotatable about a pin fixedly connected to said upper member and planarly positioned between said first idler wheel and the periphery of said upper member; a spring interplanarly and fixedly connected to said lower and upper members; a calibrated chart removably attached to said lower member; and means in said upper rotatable circular member for visually indicating the values of said calibrated chart.

3. The device in accordance with claim 2, in which the means for visually indicating the values of said calibrated chart consists of an indicator fixedly encased in an opening of said upper rotatable member and in vertically spaced juxtaposition with said calibrated chart.

4. The device in accordance with claim 2, in which the first and the second idler wheels are grooved.

References Cited in the file of this patent

UNITED STATES PATENTS

| | | |
|---|---|---|
| 2,312,419 | King | Mar. 2, 1943 |
| 2,529,320 | Vibber | Nov. 7, 1950 |
| 2,860,508 | Johnson | Nov. 18, 1958 |